US008552580B2

(12) United States Patent
Tackett

(10) Patent No.: US 8,552,580 B2
(45) Date of Patent: Oct. 8, 2013

(54) WIND TURBINE POWER GENERATION

(76) Inventor: Justin Dale Tackett, Fort Worth, TX (US)

(*) Notice: Subject to any disclaimer, the term of this patent is extended or adjusted under 35 U.S.C. 154(b) by 498 days.

(21) Appl. No.: 12/954,819

(22) Filed: Nov. 26, 2010

(65) Prior Publication Data
US 2012/0133141 A1    May 31, 2012

(51) Int. Cl.
*F03B 13/00* (2006.01)
*H02P 9/00* (2006.01)

(52) U.S. Cl.
USPC .............................. 290/55; 290/54; 60/641.11

(58) Field of Classification Search
USPC ....................... 290/43, 44, 54, 55; 60/641.11
See application file for complete search history.

(56) References Cited

U.S. PATENT DOCUMENTS

| 4,070,131 | A | * | 1/1978 | Yen ................................. 415/4.4 |
| 4,433,544 | A | * | 2/1984 | Wells et al. ................. 60/641.12 |
| 4,452,046 | A | * | 6/1984 | Valentin ..................... 60/641.11 |
| 5,381,048 | A | * | 1/1995 | Baird ............................. 290/55 |
| 6,215,199 | B1 | * | 4/2001 | Lysenko et al. .................. 290/44 |
| 6,590,300 | B1 | * | 7/2003 | Preito Santiago ............... 290/55 |
| 7,154,190 | B2 | * | 12/2006 | Kaploun .......................... 290/43 |
| 7,511,387 | B2 | * | 3/2009 | Fakhrai ........................... 290/54 |
| 8,395,276 | B2 | * | 3/2013 | Freda .............................. 290/54 |
| 2010/0171314 | A1 | * | 7/2010 | Tackett ........................... 290/55 |

* cited by examiner

*Primary Examiner* — Nicholas Ponomarenko
(74) *Attorney, Agent, or Firm* — Wilson Daniel Swayze, Jr.

(57) ABSTRACT

A wind turbine power generation for generating electricity from a fluid may include a compression module housing to compress the fluid, a turbine module housing to convert the compressed fluid into electricity, and a lower pressure reduction module housing and a upper pressure reduction module housing to exhaust the fluid from the turbine module housing. The turbine module housing may include a turbine airflow control to control the amount of fluid flowing through the turbine module housing. The turbine airflow control may include a variable diameter shutter to open and close to control the amount of fluid.

10 Claims, 14 Drawing Sheets

Fig. 5 Door Assignments

Compression Module Structure
With an Overhead View of the door configuration, and
a complete view of the Crown Ring.

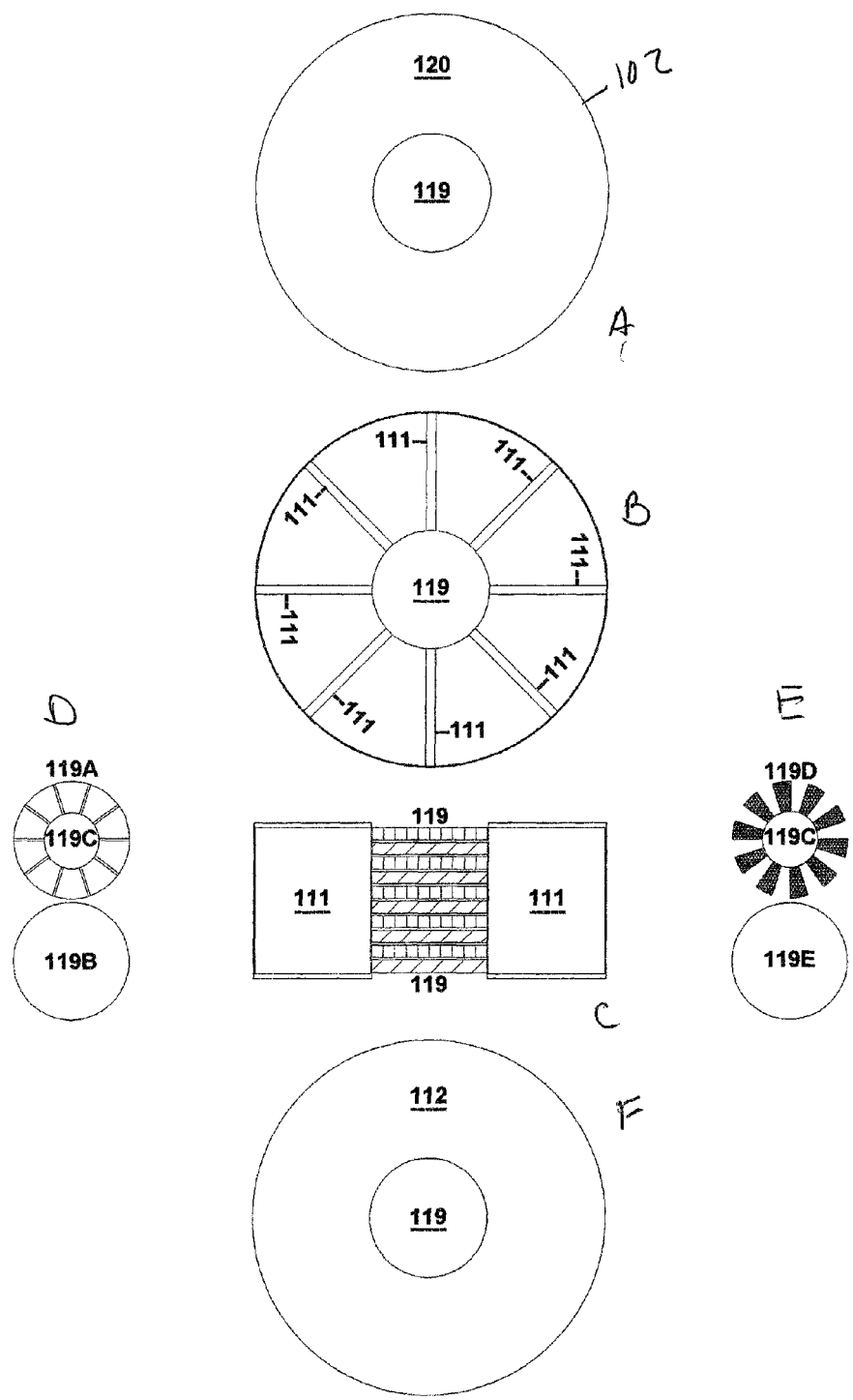

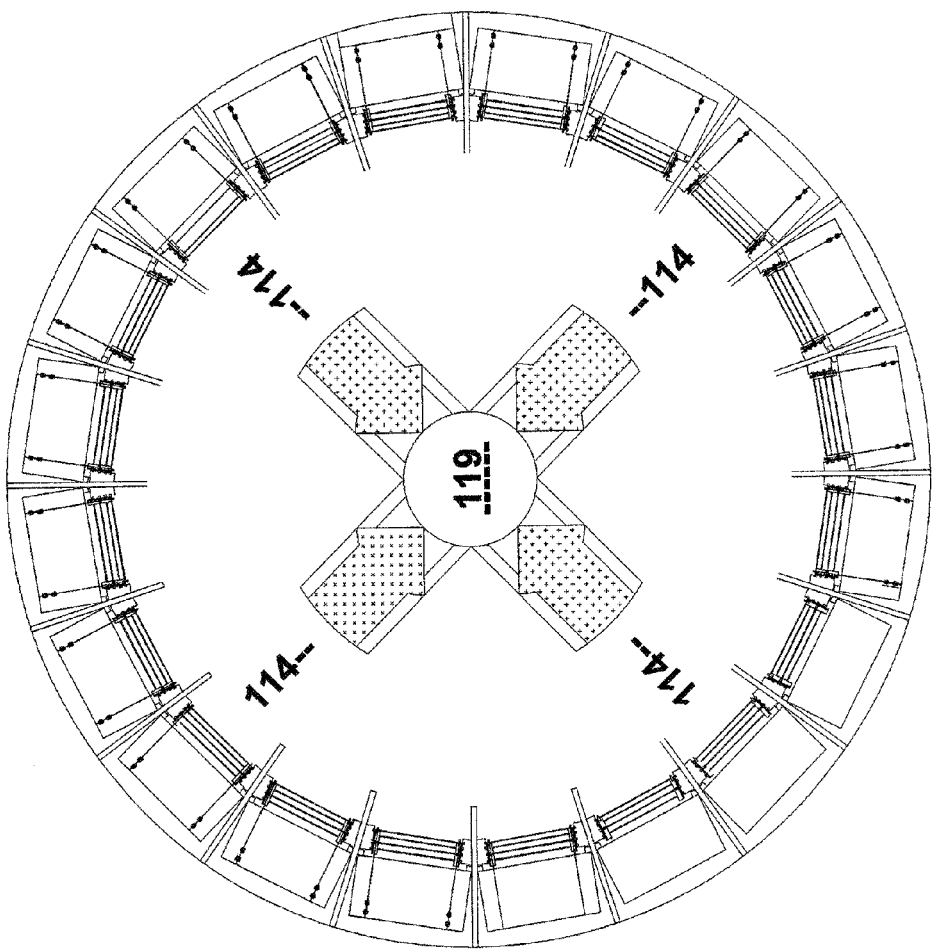

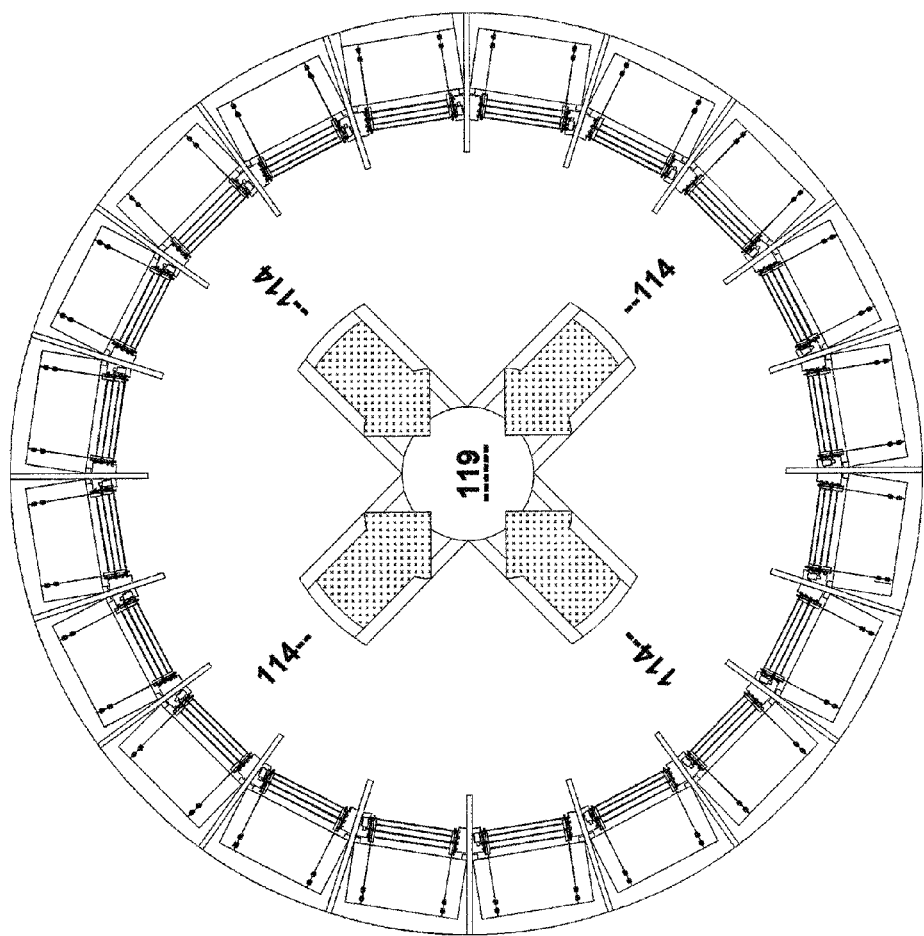

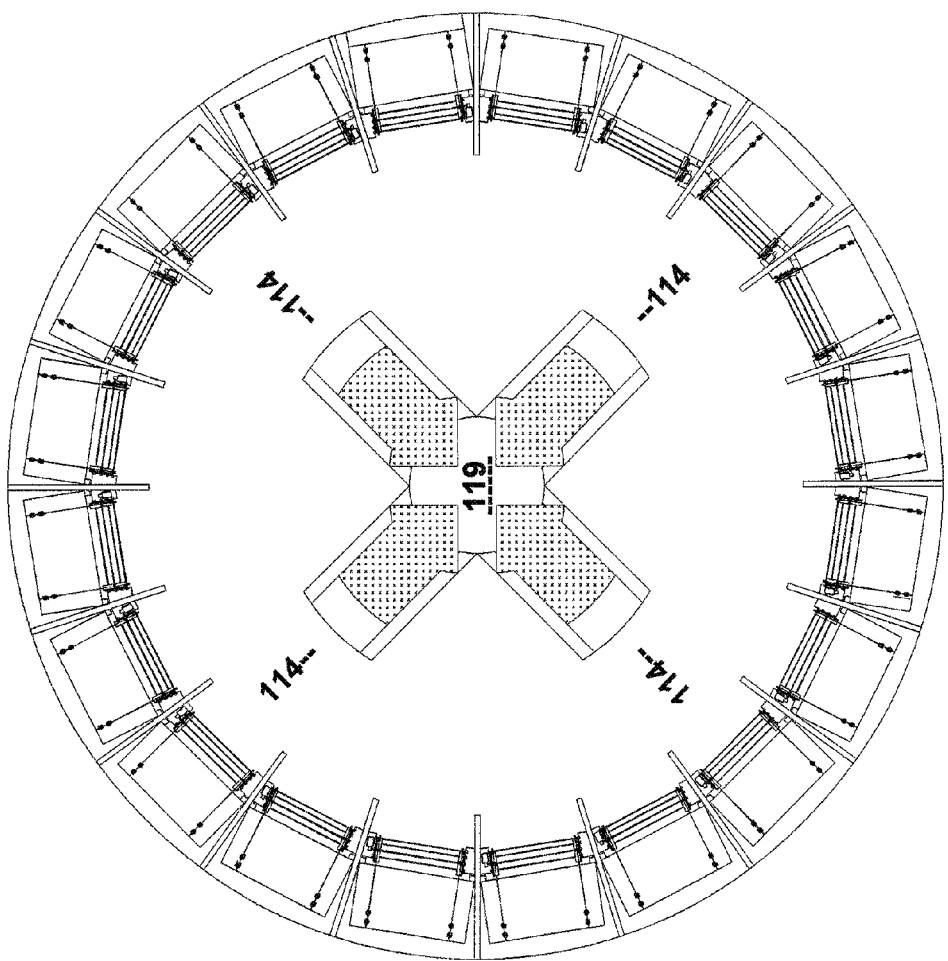

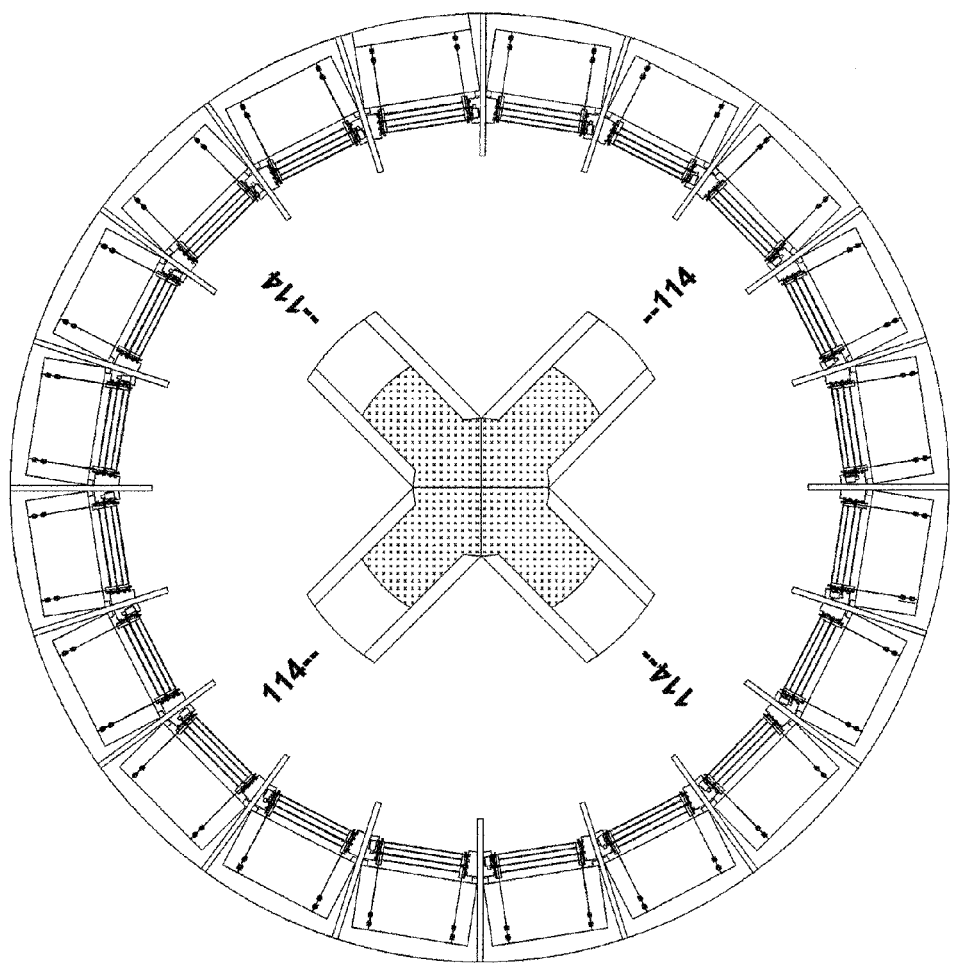

WIND TURBINE POWER GENERATION

FIELD OF THE INVENTION

The present invention relates to power generation devices and more particularly to a wind device to generate electric power.

BACKGROUND

The Betz Limit and how it affects wind turbines is a starting point for understanding wind devices to generate electric power.

Albert Betz was a German physicist who in 1919 concluded that no wind turbine can convert more than 16/27 (59.3%) of the kinetic energy of the wind into mechanical energy by turning a rotor. To this day this is known as the Betz Limit or Betz' Law. This limit has nothing to do with inefficiencies in the generator, but relates to the very nature of wind turbines themselves.

Wind turbines extract energy by slowing down the wind. For a wind turbine to be 100% efficient it would need to completely stop 100% of the wind—but this would require a solid disk rotor. Additionally, the rotor would not turn and no kinetic energy could be converted. On the other extreme, if the wind turbine had just one rotor blade, most of the wind passing through the area swept by the single turbine blade would miss the blade completely and so the kinetic energy could not be extracted from the wind.

Real World Wind Turbine Power Efficiencies

The theoretical maximum power efficiency of any design of wind turbine may be 0.59 (i.e. no more than 59% of the energy carried by the wind can be extracted by a wind turbine). Once you also factor in the engineering requirements of a wind turbine namely the strength and durability in particular, the real world limit is well below the Betz Limit with values of 0.35-0.45 being common even in the best designed wind turbines. By the time you take into account other inefficiencies in a complete wind turbine system for example the generator, bearings, power transmission and so on—only 10-30% of the power of the wind may be actually converted into usable electricity.

The current Wind Turbines designs with their Tower and Horizontally Oriented Rotor have about reached their level of diminishing returns. Their 'windmill like' design meets the Betz Limit head-on and suffers its efficiency-limiting effects. To obtain output levels in the 7.5 to 10.0 megawatt range requires extremely large structures, and these designs may be ill suited to survivability in extreme weather conditions. There is increasing public resistance to these 'windmills' in high-population areas. The quality-of-life for those living in close proximity to these devices is greatly diminished and the danger of catastrophic failure is always present. If a turbine failure should occur, the results may be catastrophic for example large sections of the turbine may fly off and endanger buildings and people nearby. The nacelle housing the gearbox and the generator is about the size of a small bus and represent dangerous flying objects when they explode.

Short useful life, escalating maintenance costs, rising insurance premiums, and increasing public resistance to installations close enough to dense population areas to not require expensive expansion of the electrical grid has placed severe limitations on the future of 'windmills.'

SUMMARY

A wind turbine power generation for generating electricity from a fluid may include a compression module housing to compress the fluid, a turbine module housing to convert the compressed fluid into electricity, and a upper pressure reduction module housing to exhaust the fluid from the turbine module housing.

The turbine module housing may include a turbine airflow control to control the amount of fluid flowing through the turbine module housing.

The turbine airflow control may include a variable diameter shutter to open and close to control the amount of fluid.

The variable diameter shutter may be controlled by a computer.

The compression module housing may include a plurality of input doors which may be individually controlled to open and close to adjust the amount of fluid entering the compression module housing.

The inlet doors may be computer-controlled.

The lower pressure increasing module housing and the upper pressure reduction module housing may cooperate with a plurality of outlet doors to exhaust the fluid.

BRIEF DESCRIPTION OF THE DRAWINGS

The invention may be understood by reference to the following description taken in conjunction with the accompanying drawings, in which, like reference numerals identify like elements, and in which:

FIG. 10a illustrates a top view of the turbine module housing;

FIG. 10b illustrates the vertical support walls of the turbine module housing;

FIG. 10c illustrates a side view of the turbine module housing;

FIG. 10d illustrates a top view of the turbine module housing;

FIG. 10e illustrates a top view of the turbine module housing;

FIG. 10f illustrates a top view of the turbine module housing;

FIG. 11 illustrates a top view of the variable diameter shutter in an grant figure open position;

FIG. 12 illustrates the top view of the variable diameter shutter in a second position;

FIG. 13 illustrates the top view of the variable diameter shutter in a third position;

FIG. 14 illustrates the top you of the variable diameter shutter in a closed position

DETAILED DESCRIPTION

The present invention provides a Concept in Wind Turbine Power Generation which may be evident by the external view of a proposed design of a wind turbine power generator 100 which may reveal a variance from current Wind Turbine thinking. The absence of large diameter exposed rotors is immediately noticeable. The design shown facilitates a detailed discussion of the philosophy of airflow conditioning to produce controlled pressure differential across an internally mounted turbine. The design may use a three-module approach to the task: the Compression Module, the Silo/Turbine Module, and the Pressure Reduction Module. The structure can be sized to match requirements as long as the proper ratios are maintained. Structure diameter, inlet/outlet height, and silo height may be matched to rotor diameter and maximum tip speed for optimum result. There should be no limit to size and capacity as long as the project meets advantageous return-on-investment parameters.

Figure 6:
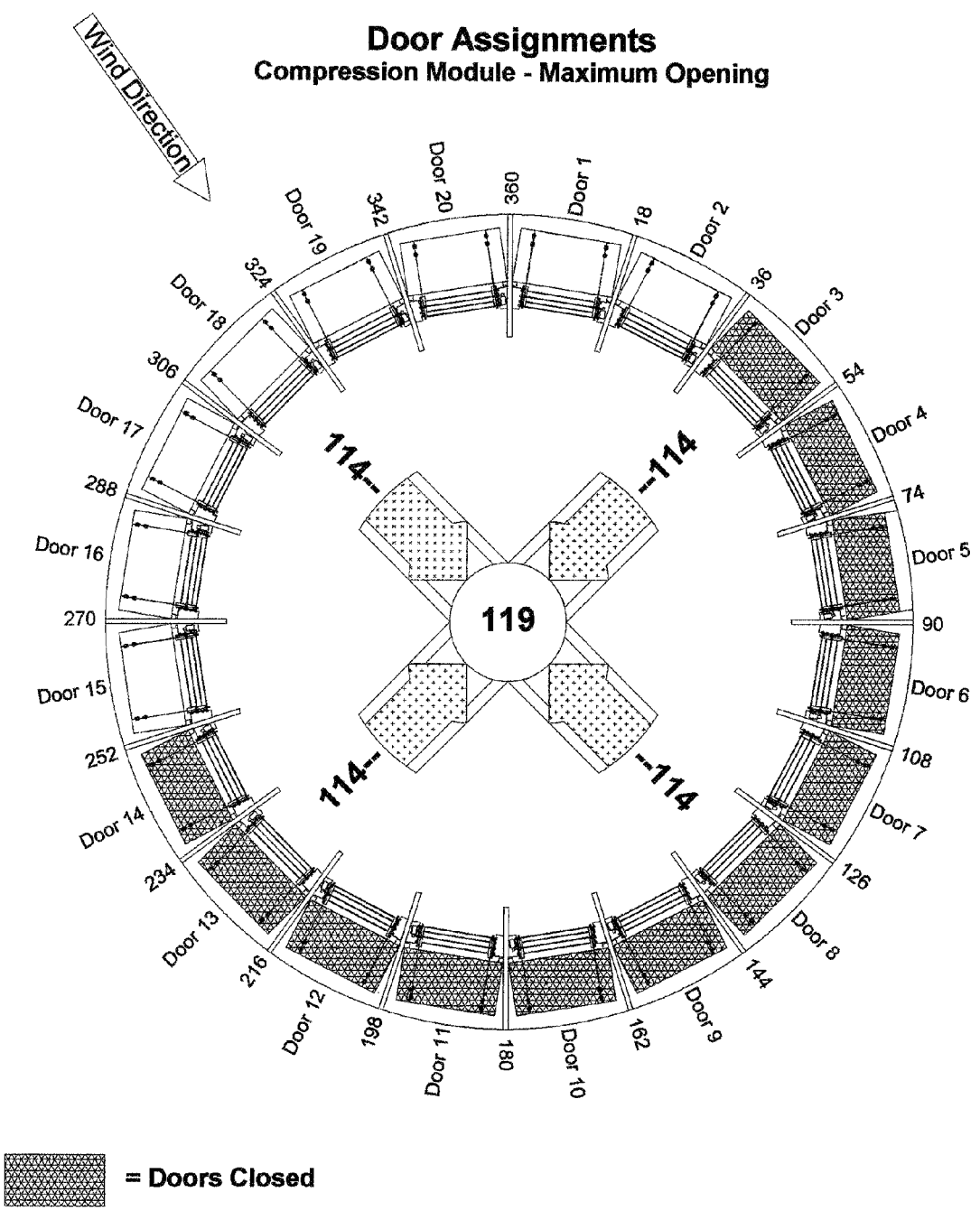
FIG. 6 illustrates a top view showing door assignments both open and closed doors.

The Compression Module may have twenty computer-controllable doors that form a 216 degree 'bow' at the downwind side of the Module cavity to trap substantially the maximum amount of low-velocity airflow into the chamber. [See FIG. 6] As the wind velocity increases additional doors will be closed to reduce the size of the inlet opening. This action will provide controlled pressure differential between the interior of the Compression Chamber and outside air pressure. The trapped air's only outlet is upward through the Silo/Turbine Module. There is an 'Iris' [FIG. 2, item 114] at the lower end of the Turbine Tube that can rapidly open or close to maintain optimum Turbine Rotor speed and pressure differential.

Figure 7:
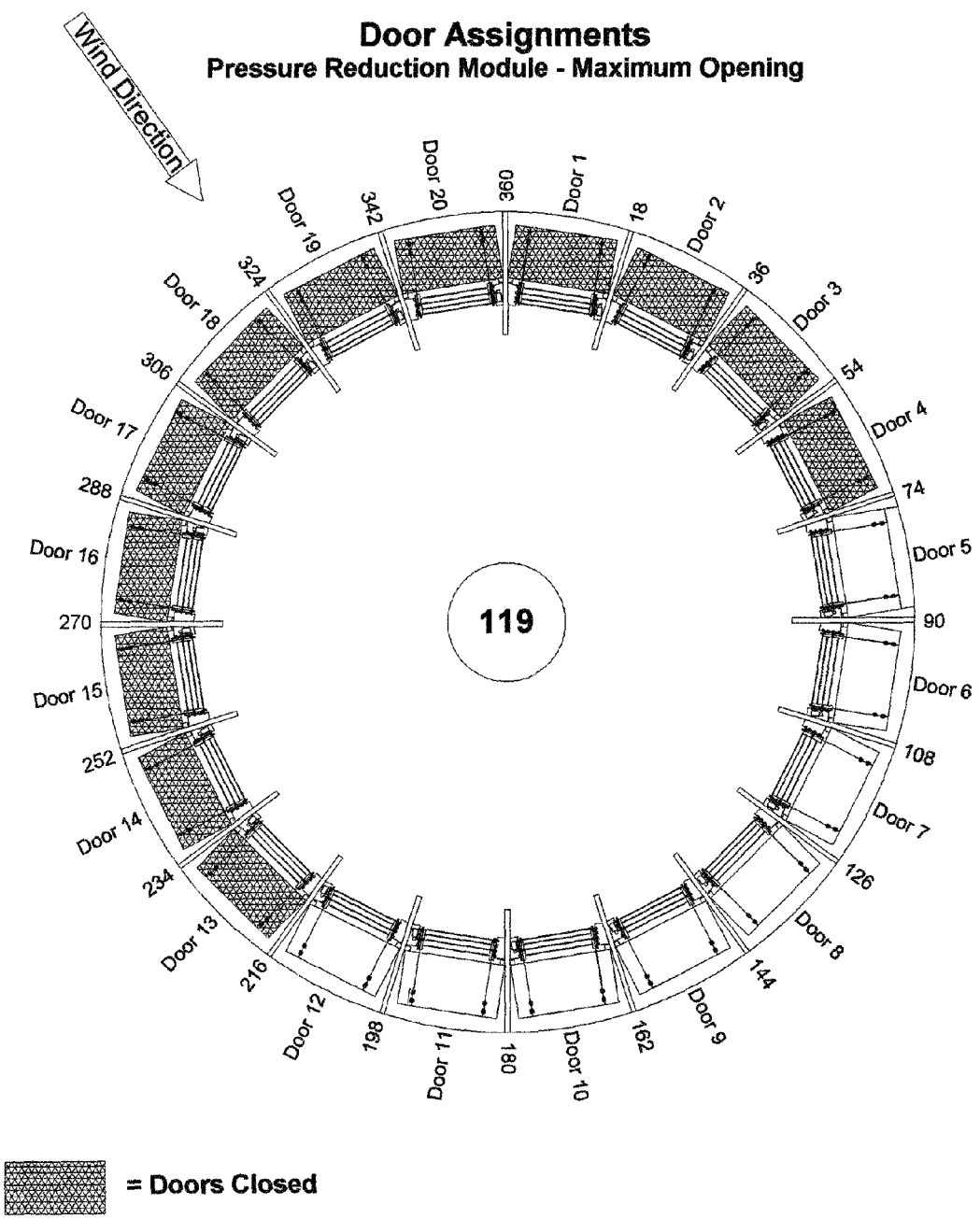
FIG. 7 illustrates a top view of the pressure reduction module housing showing the door assignments.

The Pressure Reduction Module may include an aerodynamically shaped structure with computer controllable doors which may be open and closed in response to conditions detected by the computer that form a 216 degree 'bow' on the upwind side for a low velocity airflow setup to produce a venturi-type reduction in pressure. [See FIG. 7] As with the Compression Module, additional doors may be activated by computer control to regulate the pressure differential across the Turbine as airspeed increases. The Pressure Reduction Module provides a partial vacuum at the top end of the Turbine Tube to augment the pressure differential between it and the Compression Module. The push-pull nature of the airflow across the turbine, the low-to-no blade-tip turbulence, and the exclusion of ambient air flow interference by channeling all air through the Turbine tube will alter the parameters of the Betz Effect to produce a higher percent of efficiency.

There is a pressing need to upgrade wind powered electricity generation, and the present invention provides the Three-Module Concept as a high-efficiency improvement that may be sized to fit the requirement as long as the proper ratios are substantially met: approximately 10:1 inlet/outlet openings to Turbine diameter. The concept can be used with Turbines regardless of the blade size, for example 12' diameter to 400' diameter or larger may provide satisfactory results. Any use of turbines larger than 50' will require a building that will be very large but might fit Return on Investment parameters.

An existing Wind Turbine uses a 413' diameter rotor turning at 12 RPM with a tip speed of 177 MPH to generate 6,702 hp [5,000,000 watts] at a wind speed of 30 MPH. The torque required is 3,518,767 ft-lb./min. spread over the three blades: each blade must generate 1,172,922 ft-lb./min.

A Three-Module unit with a 413' diameter rotor turning at 24 RPM with a tip speed of 354 MPH in a structure that conforms to the proper ratios could produce 20,000,000 watts if configured as 5 rotors with 10 blades each. Torque requirement per blade may be 117,000 ft-lb./min. The building may be enormous and very expensive to build but might meet R.O.I. parameters. Data derived from computer analysis and empirical results should provide valid risk/reward information.

Component Identification Numbers

Figure 1:
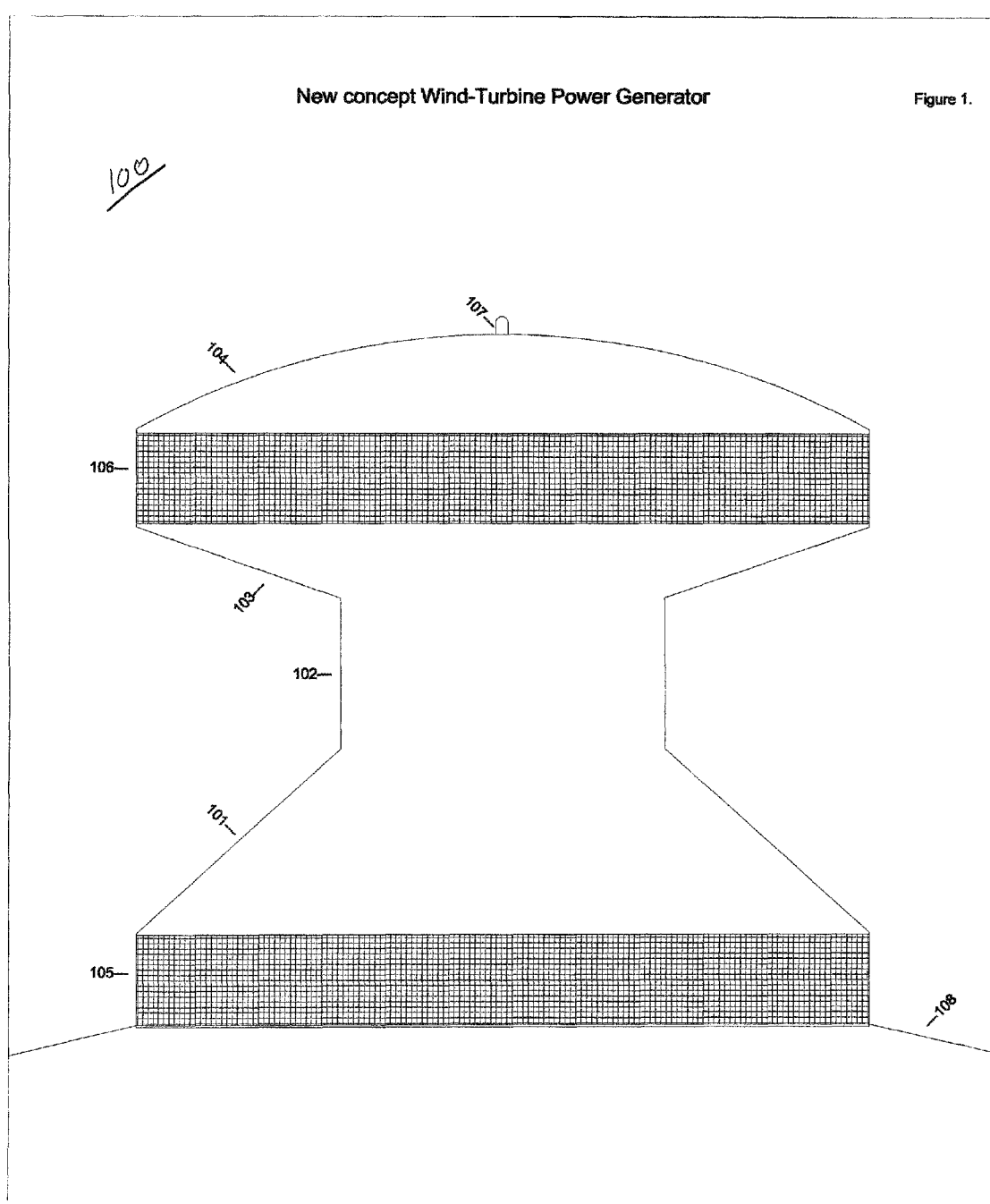
FIG. 1 illustrates a side view of the wind turbine power generator.

FIG. 1 shows an external view of a design to help explain the use of selectively conditioned pressure differential as a means of accelerating airflow through a turbine enclosure. Subsequent Figures display the design's configuration used to accomplish the task.

FIG. 1: An External View of the Proposed Structure.

The compression module housing 101 may form an Outer Support/Covering sheath of the Compression Module. The housing 101 may provide structural strength and presents a smooth exterior surface for the compression Module.

The turbine module housing 102 may be connected to the compression module housing 101 and may form an Outer Support/Covering sheath of the Turbine Module. The housing 102 may provide structural strength and presents a smooth exterior surface for the turbine Module.

The lower pressure increasing module housing 103 may be connected to the turbine module housing 102 and may form an Outer Support/Covering sheath of the Lower Portion of the Pressure Reduction Module. The pressure reduction module housing 103 may provide structural strength and may provide a smooth exterior surface for the Module.

The upper pressure reduction module housing 104 may form an Outer Support/Covering sheath of the Upper Portion of the Pressure Reduction Module. The upper pressure reduction module housing 104 may provide structural strength and presents a smooth exterior surface for the Module.

A multitude of compression module protection screens 105 may be connected to the compression module housing 101 and may aid in the prevention of debris from entering the module and may prevent bird intrusion into the interior of the Compression Module. This eliminates one of the drawbacks to the conventional type 'Wind Turbines' which is they kill birds.

A multitude of pressure reduction protection screens 106 may be connected to the lower pressure increasing module housing 103 and may prevent debris from entering the pressure reduction module and may prevent bird intrusion into the interior of the Pressure Reduction Module, One of the drawbacks to the conventional type 'Wind Turbines' is they kill birds.

An aircraft warning lights 107 may be positioned at the substantially highest point of the structure and may be connected to the upper pressure reduction module housing 104. More than one warning light 107 may be mounted to outline the entire structure if desired. Older type 'wind turbines' only allowed mounting a light at the top of the tower and not at the tip of the blade which may be in some cases in excess of 200 feet above the tower, whirling above while being totally invisible at night.

Although the present invention is described in terms of wind and airflow, the principles of the invention are equally applicable to other types of fluids.

These facility support base 108 may be connected to the compression module housing 101 and a support surface and may be a truncated cone whose upper level may be at least ten feet above surrounding terrain.

Figure 2:
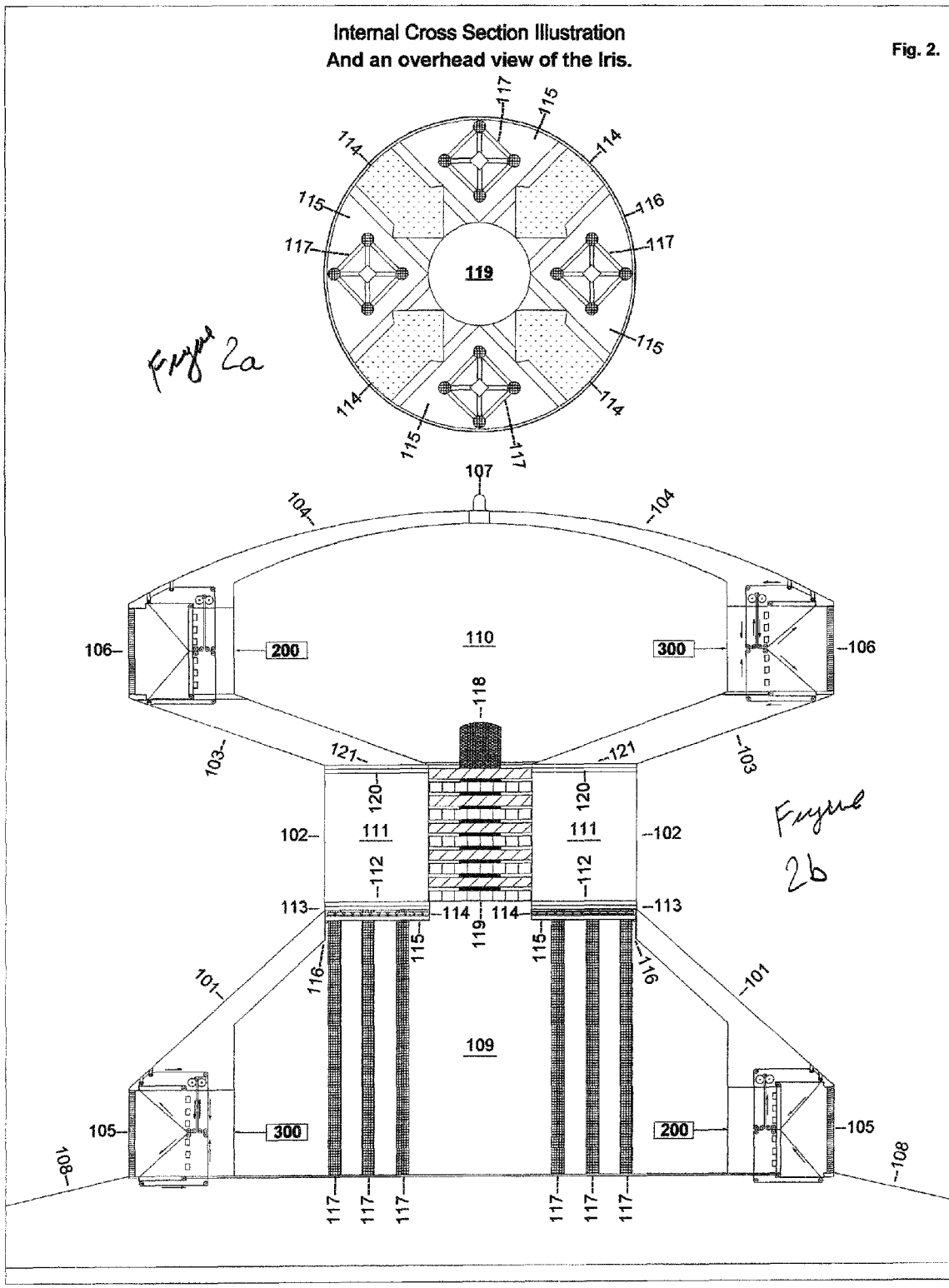
FIG. 2a illustrates a top view of the turbine airflow control.
FIG. 2b illustrates a cross-sectional view of the wind turbine power generator.
Figure 5:
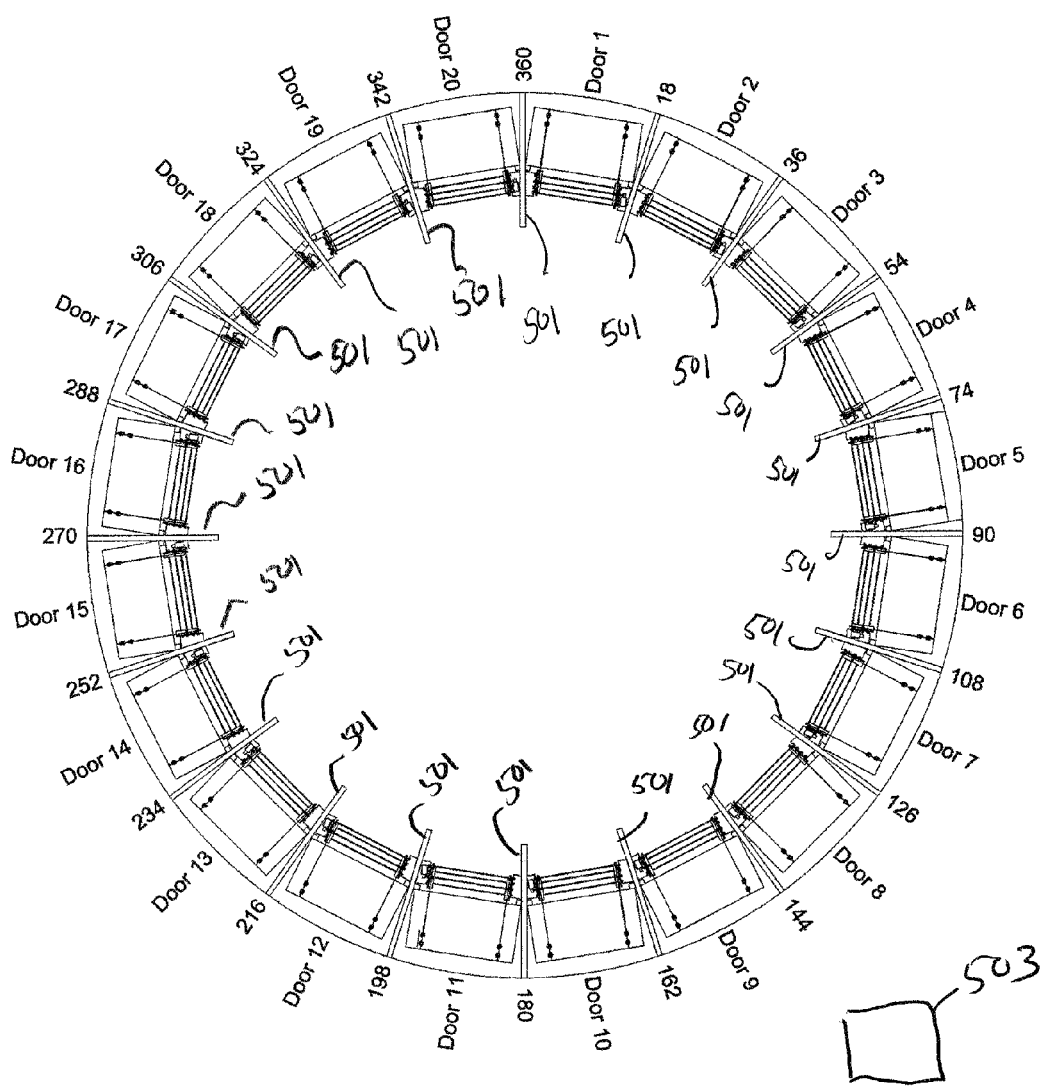
FIG. 5 illustrates a top view showing the door assignments.

FIG. 2 may illustrate a Cross Section view including two opposing walls of a twenty-wall circular structure: see FIG. 5, 6, or 7 for an overhead view of the configuration.

The compression module cavity 109 within the compression module housing 101 may include main support columns 117 to support the turbine housing module 102 and support the Crown Ring 116 may be excluded to reduce clutter. The inner support bracing which may include the support columns 117 and the Crown Ring 116 may be robust to prevent damage to the Module during extreme weather conditions due to the high inside-to-ambient pressure differential that can exist.

The pressure reduction module cavity 110 may be defined by the upper portion module housing 104 and the lower portion module housing 102 may include internal support bracing (not shown) to support the housing 103 and the housing 104. The internal support bracing may be excluded to prevent clutter. The inner support bracing may be robust to prevent damage to the Module during extreme weather conditions due to the high inside-to-ambient pressure differential that can exist. Note the aerodynamic shape of the Module, its function is to a lowered pressure environment inside the module and at the upper end of the Turbine Tube.

The vertical support wall 111 which may be connected to the Crown ring 116 of the Silo/Turbine Module. The walls 111, the turbine module housing 102 and the turbine tube member 119 may provide support for the Pressure Reduction Module housing 103, 104 and an opening to hold the Turbine Assembly.

The Silo/Turbine Module-to-Compression Module Mounting Plate 112 which may be circular is positioned on the Circular Support Compression Module-to Silo/Turbine Module Mounting Plate 113 which may be circular.

The Turbine Airflow Control 114 may include variable diameter shutter 115 which may open and close under the control of the computer 503 (see FIG. 2A) "Iris" to provide quick reaction to control the airflow input and to control pressure differential changes within the turbine tube member 119.

The circular mounting plate 115 to cooperate with the turbine airflow control 114 and to attach to inside the Crown Ring 116.

Figure 9:
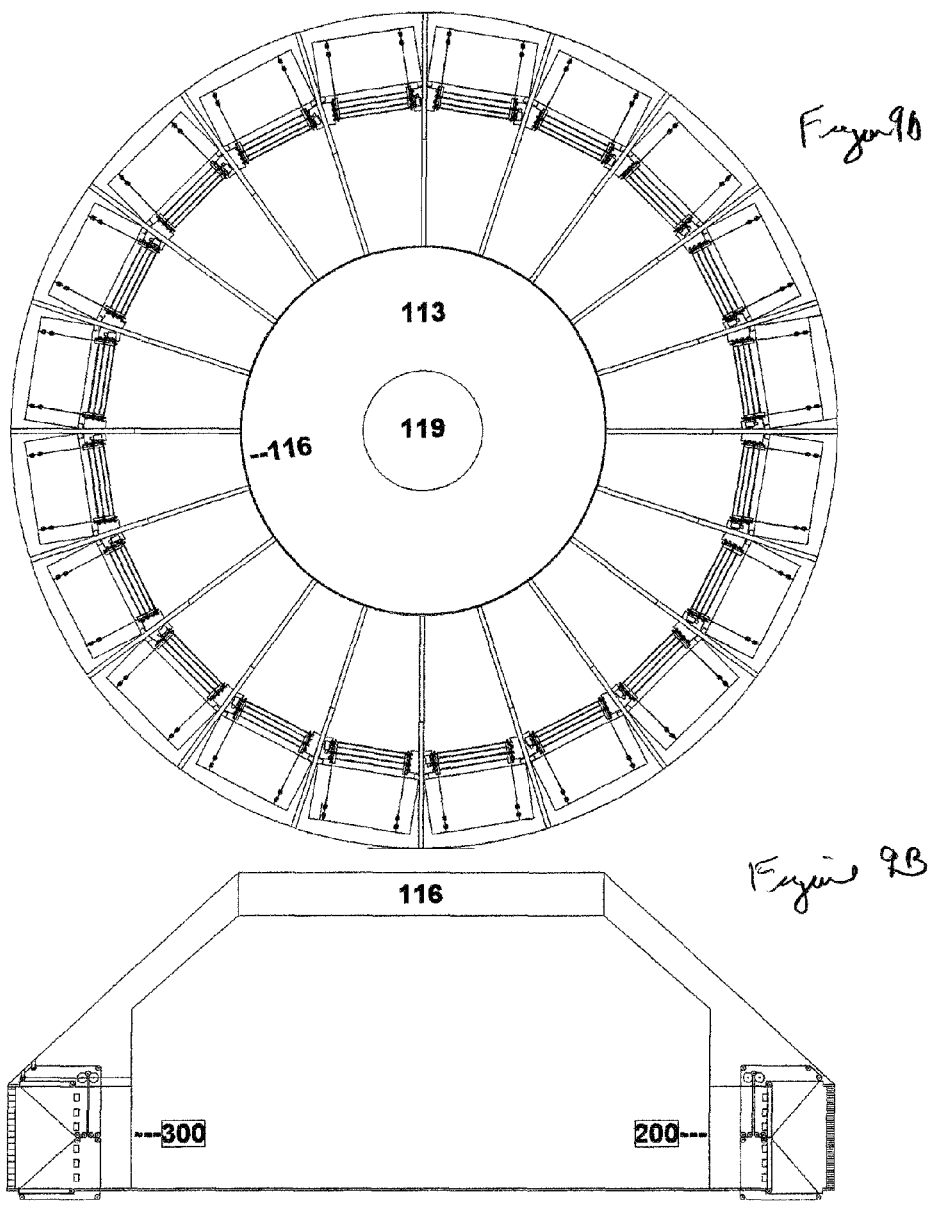
FIG. 9a illustrates a top view of the compression module housing.
FIG. 9b illustrates a side view of the compression module housing.

The Crown Ring 116 is shown in a cross section view is all that is shown on in FIG. 2, but is shown in more detail in FIG. 9. Main Support Columns 117 may extend from the support surface of the Compression Module 109 to the underside of the Support Compression Module-to-Silo/Turbine Module Mounting Plate 113. Mounting Plate 113 is not shown in FIG. 2A which may be an Overhead View of the turbine airflow control 114 (Iris) to show the positioning of the Main Support Columns 117 are placed with respect to the turbine airflow control 114 (Iris) as the main support columns 117 extend through the Iris Mounting Plate 115.

Power Generation Enclosure 118 extends within the turbine tube member 119 which may be vertically oriented to enclose the turbines including the turbine blades.

The Discrete Elements that Make Up the Turbine Assembly

A Turbulence Abatement Disk 119A as illustrated in FIG. 10D to abate and control turbulence in and around the turbine blades 119D. The present invention may employ a multitude of turbulence abatement disks 119A: the number may be decided by test data that decides the number of rotors to be attached to the Vertical Shaft. Additional rotors may be a force-multiplier but testing will verify or dispute the assumption.

The diameter of the Turbine Tube member 119 may correspond to the Turbulence Abatement Disks (119A) may be attached to the interior diameter of the Turbine Tube and act as a Stator. The vertically oriented vanes of the disk may support the bearings of the Turbine and reform the airflow coming off a rotor to reduce the turbulence encountered by the next rotor.

The Vertical Shaft 119C may include a Wind Diversion Nacelle that directs a portion of the air inside the Turbine Tube to the outer portions of the Turbine Blades to increase efficiency.

Turbine Rotor 119C may be positioned within the turbine to member 119. The number and shape of the blades 119 C should be determined by Wind Tunnel Testing. The outside diameter of the rotors 119C may be is slightly less than the Turbine-Tube, The short distance between the rotor tips and the wall of the Tube may reduce generation of tip-turbulence. The Betz Limit's effect depends on interaction between tip-turbulence, 'slowed air,' and ambient air. With ambient air excluded, tip-turbulence greatly reduced, and a partial vacuum to maintain the flow of air after passing through the turbine the Betz Limit should be modified to allow a higher degree of efficiency.

The Support/Silo/Turbine Module-to-Pressure Reduction Module Mounting Plate 120 may be circular and may be positioned adjacent to the lower pressure increasing module housing 103.

The Support/Pressure Reduction Module-to Silo/Turbine Module Mounting Plate 121 may be circular and may cooperate with the module-to-pressure reduction module mounting plate 120.

Figure 3:
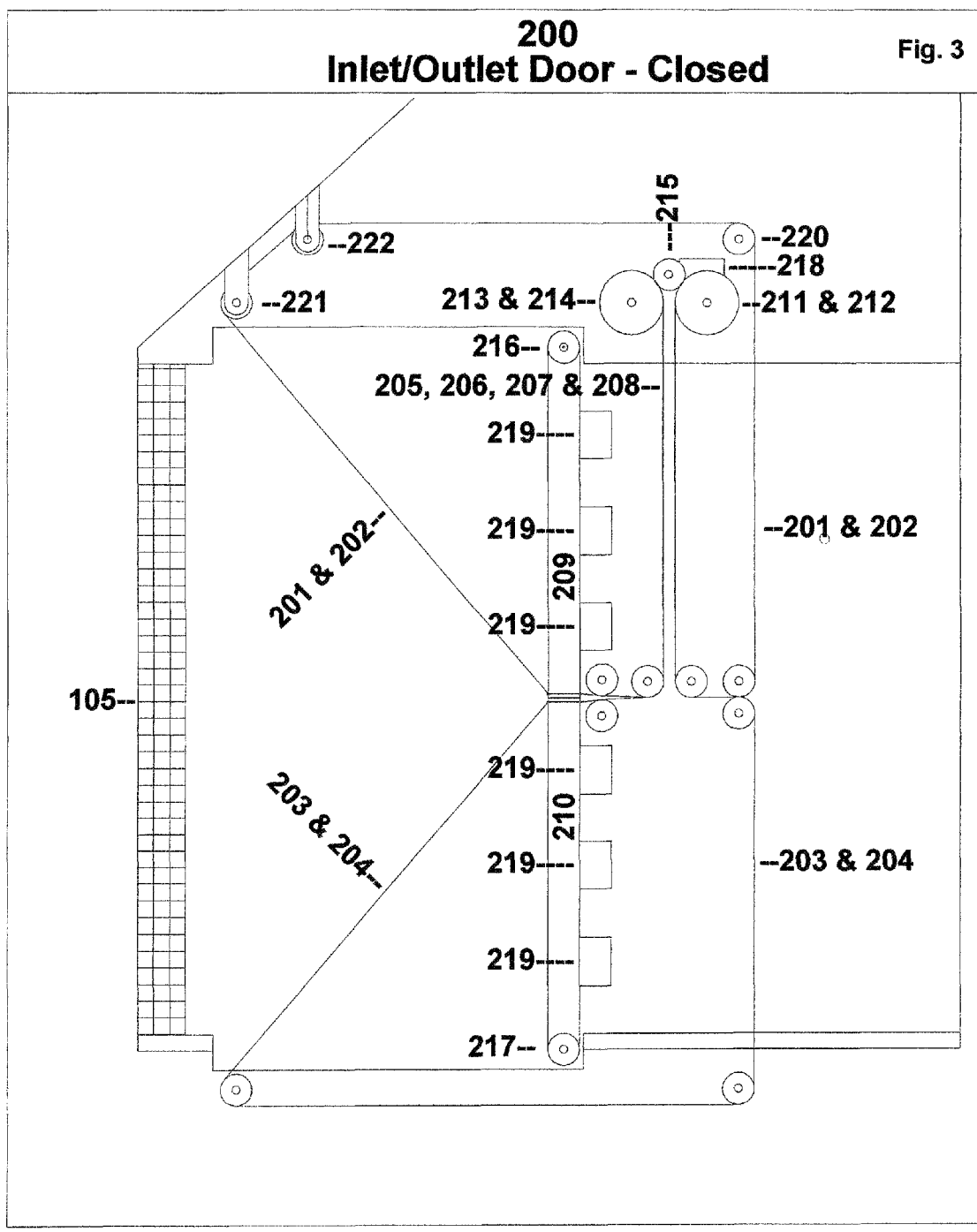
FIG. 3 illustrates a top view of the inlet/outlet door in a closed position.

FIG. 3 illustrates an expanded view of the inlet/outlet door 200 and is illustrated closed.

FIG. 3 illustrates a cable 201 for the Inlet/Outlet Door which may be attached to the right hand upper surface of the top door.

A cable 202 for the Inlet/Outlet Door may be attached to the left-hand upper surface for the top door.

A cable 203 for the Inlet/Outlet Door may be attached to the right-hand upper surface for the bottom door 210.

A cable 204 for the Inlet/Outlet Door may be attached to left-hand upper surface of the bottom door 210.

A cable 205 for the Inlet/Outlet Door may be attached to the right-hand lower surface for the top door 209.

A cable 206 for the Inlet/Outlet Door may be attached to the left-hand lower surface for the top door 209.

A cable 207 for the Inlet/Outlet Door may be attached to the right-hand lower surface for the bottom door 210.

A cable 208 for the Inlet/Outlet Door may be attached to the left-hand lower surface for the bottom door.

FIG. 3 additionally illustrates Cable Drum 211 for Cable 201 and illustrates Cable Drum 212 for Cable 202.

FIG. 3 illustrates Cable Drum 213 for Cable 203 and illustrates Cable Drum 214 for Cable 204.

Door Drive Gear 215 drives the cable drum 211 and the cable drum 212.

Pivot Shaft 216 pivots the top door 209, and Pivot shaft 217 pivots the bottom door 210.

Door Positioning Motor 218 to drive the door drive gear 215 which opens and closes the bottom door 210 and the top door 209.

The top door 209 and the bottom door 210 may cooperate with Door Stops 219 in the Closed Position.

FIG. 3 illustrates the Interior Cable Pulley 220, Primary Door Support Cable

Pulley 221 and the Vertical Clearance Cable Pulley 222.

Figure 4:
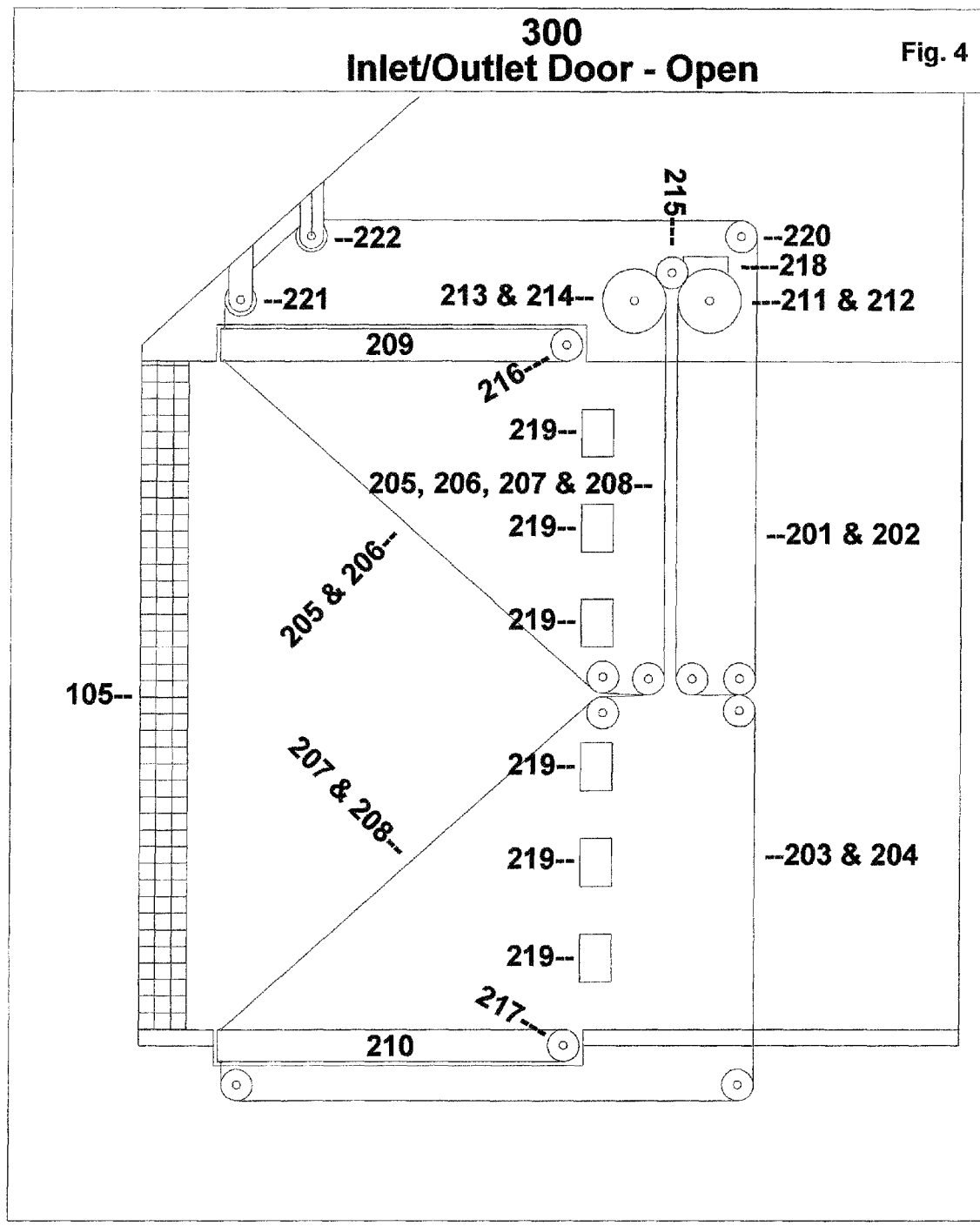
FIG. 4 illustrates a top view of the inlet/outlet door in an open position.

FIG. 4 illustrates an expanded view of the inlet/outlet door 200 and is illustrated as opened.

FIG. 4 illustrates a cable 201 for the Inlet/Outlet Door which may be attached to the right hand upper surface of the top door.

A cable 202 for the Inlet/Outlet Door may be attached to the left-hand upper surface for the top door.

A cable 203 for the Inlet/Outlet Door may be attached to the right-hand upper surface for the bottom door 210.

A cable 204 for the Inlet/Outlet Door may be attached to left-hand upper surface of the bottom door 210.

A cable 205 for the Inlet/Outlet Door may be attached to the right-hand lower surface for the top door 209.

A cable 206 for the Inlet/Outlet Door may be attached to the left-hand lower surface for the top door 209.

A cable 207 for the Inlet/Outlet Door may be attached to the right-hand lower surface for the bottom door 210.

A cable 208 for the Inlet/Outlet Door may be attached to the left-hand lower surface for the bottom door.

FIG. 4 additionally illustrates Cable Drum 211 for Cable 201 and illustrates Cable Drum 212 for Cable 202.

FIG. 4 illustrates Cable Drum 213 for Cable 203 and illustrates Cable Drum 214 for Cable 204.

Door Drive Gear 215 drives the cable drum 211 and the cable drum 212.

Pivot Shaft 216 pivots the top door 209, and Pivot shaft 217 pivots the bottom door 210.

Door Positioning Motor 218 to drive the door drive gear 215 which opens and closes the bottom door 210 and the top door 209.

The top door 209 and the bottom door 210 may cooperate with Door Stops 219 in the Closed Position.

FIG. 4 illustrates the Interior Cable Pulley 220, Primary Door Support Cable Pulley 221 and the Vertical Clearance Cable Pulley 222.

FIG. 5 illustrates potential assignments for doors 209, 210 which may be individually controlled by computer 503 in accordance with the Betz laws or restrictions.

Shown in FIG. 5 is an overhead view of the wind-deflection/support walls 501 which may extend radially of the Compression and Pressure Reduction Modules. Each of the doors may be under computer control. The ambient wind direction, wind speed, turbine rotational speed, and structural pressure differential will determine which will be open and which will be closed.

FIG. 6 illustrates an example of assignments for Door 210 for the Compression Module.

The doors 210 for the Compression Module may be closed to form a 216-degree "bow" on the downwind side of the Module and a 144 degree opening at the inlet side for a Minimum Wind Speed Configuration. Additional doors will be closed or open as required by increased or changes in wind speed induced pressure differential as detected by the computer 503. The opening and closing of the doors may be under the control of the computer 503. The pressure differential between the Module's interior air pressure and external air pressure may be determined by the number of doors open and the setting of the Iris 114. FIG. 6 additionally illustrates the Turbine Tube 119.

FIG. 7 illustrates assignments for the door 209 for the Pressure Reduction Module housing 103.

The doors for the Pressure Reduction Module may be closed to form a 216-degree "bow" on the upwind side of the Module and a 144 degree opening at the outlet side for a Minimum Wind Speed Configuration. The aerodynamic configuration of the Module may cause a reduction of air pressure inside as the air flows over the Module's contours, Additional doors may be closed or open as needed to maintain the desired pressure differential across the lower and upper ends of the Silo/Turbine Module 119. The Circular Support/Pressure Reduction Module-to Silo/Turbine Module Mounting Plate 121 is not shown to prevent confusion as to the diameter of the available upward path.

Figure 8:
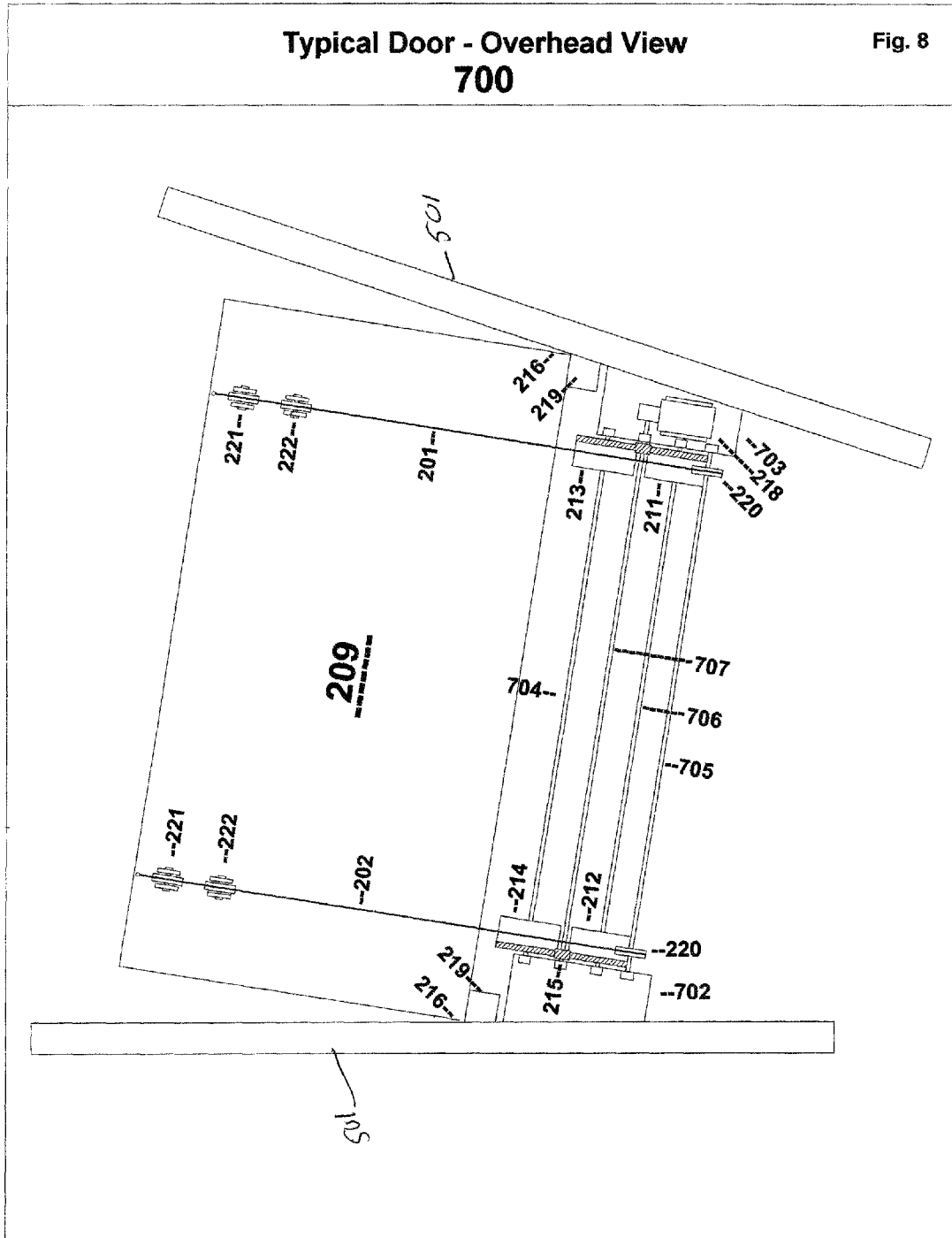
FIG. 8 illustrates a sectional view of the door.

FIG. 8 illustrates an overhead view of the Inlet/Outlet Door 209, 210. FIG. 8 additionally illustrates a Wind Diversion/Support wall 501. Each wall 501 may be separated by 18 degrees from the other. This separation allows 20 walls in a 360-degree configuration that will provide physical response to a computer algorithm dedicated to positioning the open or closed state of the doors for optimum control of the air flowing through the structure. The normal, low velocity airflow configuration has a 216-degree band of closed doors at the 'downwind' side of the Compression Module with a 144-degree opening to incoming wind. The Pressure Reduction Module has a 216-degree band of closed doors at the 'upwind' side and a 144-degrees opening at the 'downwind' outlet side. As the wind velocity increases additional door closures will be added as required to provide optimum pressure differential between the Compression Module and the Pressure Reduction Module. The turbine airflow control 114 or IRIS FIG. 2 and FIG. 6 at the lower end of the vertically oriented Silo/Turbine Module is there to respond to rapid changes of the pressure differential.

Support Structure member 702 to house the bearings for the shafts 212 [Cable Drum for Cable 202: the left side cable for the Upper Surface of Upper Door 2091, 214 [Cable Drum for Cable 206: left-hand lower surface Cable for the top door.] 215 [Door Drive Gear] and 220 [Interior Cable Pulley]

Support Structure member 703 to house the bearings of Shaft 213 [Cable Drum for Cable 203: right-hand upper surface Cable for the bottom door.], 211 [Cable Drum for Cable 201: right hand upper surface Cable for the Top Door, 215 [Door Drive Gear], 220 [Interior Cable Pulley], and Door Positioning Motor 218 to drive the door drive gear 215 which opens and closes the bottom door 210 and the top door 209.

A shaft 704 for Cable Drums 213 and 214.

A shaft 705 for Interior Cable Pulley 220.

The Shaft 706 for Cable Drums 211 and 212: not shown in this illustration.

The Shaft 707 for the Drive Gear.

Items included that originated from previous illustrations:

FIG. 7 illustrates a cable 201 for the Inlet/Outlet Door which may be attached to the right hand upper surface of the top door.

A cable 202 for the Inlet/Outlet Door may be attached to the left-hand upper surface for the top door.

A cable 203 for the Inlet/Outlet Door may be attached to the right-hand upper surface for the bottom door 210.

A cable 204 for the Inlet/Outlet Door may be attached to left-hand upper surface of the bottom door 210.

A cable 205 for the Inlet/Outlet Door may be attached to the right-hand lower surface for the top door 209.

A cable 206 for the Inlet/Outlet Door may be attached to the left-hand lower surface for the top door 209.

A cable 207 for the Inlet/Outlet Door may be attached to the right-hand lower surface for the bottom door 210.

A cable 208 for the Inlet/Outlet Door may be attached to the left-hand lower surface for the bottom door.

FIG. 7 additionally illustrates Cable Drum 211 for Cable 201 and illustrates Cable Drum 212 for Cable 202.

FIG. 7 illustrates Cable Drum 213 for Cable 203 and illustrates Cable Drum 214 for Cable 204.

Door Drive Gear 215 drives the cable drum 211 and the cable drum 212.

Pivot Shaft 216 pivots the top door 209, and Pivot shaft 217 pivots the bottom door 210.

Door Positioning Motor 218 to drive the door drive gear 215 which opens and closes the bottom door 210 and the top door 209.

The top door 209 and the bottom door 210 may cooperate with Door Stops 219 in the Closed Position.

FIG. 7 illustrates the Interior Cable Pulley 220, Primary Door Support Cable Pulley 221 and the Vertical Clearance Cable Pulley 222.

FIG. 9: Compression Module Structure which shows how the Wind Diversion/Support Walls 501 may be connected to the Crown ring 116 to provide major support of the structure. Additional internal bracing may be used to provide support but is not shown to prevent clutter. The Circular Support Compression Module-to Silo/Turbine Module Mounting Plate 113 provides support to the Crown Ring 116 and allows rigid connection to The Circular Silo/Turbine Module-to-Compression Module Mounting Plate 112. (Not shown in FIG. 9)

Main Support Columns 117 which may extend from the floor of the Compression Module to the underside of the Circular Support Compression Module-to-Silo/Turbine Module Mounting Plate 113. Mounting Plate 113 is not shown in FIG. 2 Overhead View of the Iris to permit showing how the Main Support Columns 117 are placed in relation to the Iris as they pass through the Iris Mounting Plate 115 which is not shown in this figure.

Power Generation Enclosure 118 and the turbine and turbine tube 119 is not shown in this figure, but the turbine tube is shown.

Please see FIG. 3 for an expanded view of the Inlet/Outlet Door 209, 210 shown closed.

Please see FIG. 4 for an expanded view of the Inlet/Outlet Door 209, 210 being shown open.

FIG. 10 illustrates a top of the Silo/Turbine Module.

This illustration shows a typical Silo/Turbine configuration used to connect the Compression Module to the Pressure Reduction Module. The Silo consists of:

A turbine housing module 102 is illustrated in FIG. 10A which may be an outer Support/Covering sheath of the Turbine Module.

The vertical support walls as shown in FIG. 10B of the Silo/Turbine Module. The taller the Silo the more efficient the Generator Structure.

The Silo/Turbine Module-to-Compression Module Mounting Plate 112 is illustrated in FIG. 10F to provide a bonding of the turbine housing module 102 such as the Outer Support Covering sheath 102, the vertical support walls 111, and The Turbine tube 119B.

104 The vertically oriented Wind Turbine. [See the Betz Limit Discussion.]

Discrete Elements that Make Up the Turbine

Turbulence Abatement Disk 119A is shown in FIG. 10D, and the number of the disks may be determined by test data that decides the number of rotors to be attached to the Vertical Shaft. Additional rotors may be a force-multiplier but testing will verify or dispute the assumption.

The Diameter of the Turbine Tube 119B may be shown in FIG. 10D, and the Turbulence Abatement Disks 119A may be attached to the interior diameter of the Turbine Tube and act as a Stator. The vertically oriented vanes of the disk are to support the bearings of the Turbine and reform the airflow coming off a rotor to reduce the turbulence encountered by the next rotor.

The Vertical Shaft 119C as shown in FIG. 10D with a Wind Diversion Nacelle that directs the air inside the Turbine Tube to the outer portions of the Turbine Blades to increase efficiency.

A Turbine Rotor 119D is illustrated in FIG. 10E, and the number and shape of the blades may be determined by Wind Tunnel Testing. The rotors' 119D outside diameter maybe slightly less than the Turbine-Tube. The short distance between the rotor tips and the wall of the Tube reduces generation of tip-turbulence. The Betz Limit's effect depends on interaction between tip-turbulence, 'slowed air,' and ambient air. With ambient air excluded, tip-turbulence greatly reduced, and a partial vacuum to maintain the flow of air after passing through the turbine the Betz Limit should be modified to allow a higher degree of efficiency.

The diameter of the Turbine Rotors 119E is illustrated in FIG. 10E.

The Support/Silo/Turbine Module-to-Pressure Reduction Module Mounting Plate 120 is illustrated in FIG. 10A.

This illustrates the bonding of the Outer Support/Covering sheath 102, the vertical support walls 111, and The Turbine Tube 119B into a connecting element between the Compression Module and the Pressure Reduction Module and provides a tube for the Turbine.

FIG. 11 illustrates variable diameter shutter 115 being substantially open FIG. 12 illustrates the variable diameter shutter 115 in a first position, moving to restrict airflow.

FIG. 13 illustrates the variable diameter shutter 115 in a second position, moving to restrict airflow.

FIG. 14 illustrates the variable diameter shutter 115, completely closed.

The Iris is dynamically positioned to control airflow through the Turbine Tube. The Illustrations above show four different positions to show movement of the variable diameter 115 of the Iris 114 and the Turbine Tube 119.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A wind turbine power generation for generating electricity from a fluid, comprising:
   a compression module housing to compress the fluid;
   a turbine module housing to convert the compressed fluid into electricity;
   a lower pressure reduction module housing and a upper pressure reduction module housing to exhaust the fluid from the turbine module housing;
   wherein the turbine module housing includes a turbine airflow control to control the amount of fluid flowing through the turbine module housing.

2. A wind turbine power generation for generating electricity from a fluid as in claim 1, wherein the turbine airflow control includes a variable diameter shutter to open and close to control the amount of fluid.

3. A wind turbine power generation for generating electricity from a fluid as in claim 2, wherein the variable diameter shutter is controlled by a computer.

4. A wind turbine power generation for generating electricity from a fluid as in claim 1, wherein the compression module housing includes a plurality of input doors which may be individually controlled to open and close to adjust the amount of fluid entering the compression module housing.

5. A wind turbine power generation for generating electricity from a fluid as in claim 4, wherein the doors are computer-controlled.

6. A wind turbine power generation for generating electricity from a fluid as in claim 1, wherein the lower pressure increasing module housing and the upper pressure reduction module housing cooperate with a plurality of outlet doors to exhaust the fluid.

7. A wind turbine power generation for generating electricity from a fluid as in claim 1, wherein the fluid is air.

8. A wind turbine power generation for generating electricity from a fluid as in claim 2, wherein the fluid is air.

9. A wind turbine power generation for generating electricity from a fluid as in claim 4, wherein the fluid is air.

10. A wind turbine power generation for generating electricity from a fluid as in claim 6, wherein the fluid is air.

* * * * *